United States Patent [19]

Hasegawa

[11] Patent Number: 4,870,294
[45] Date of Patent: Sep. 26, 1989

[54] IMAGE SCANNING APPARATUS WITH EXPANDED MAGNIFICATION CAPABILITY

[75] Inventor: Hirofumi Hasegawa, Osaka, Japan
[73] Assignee: Minolta Camera Kabushiki Kaisha, Osaka, Japan
[21] Appl. No.: 173,828
[22] Filed: Mar. 28, 1988
[30] Foreign Application Priority Data
  Apr. 1, 1987 [JP] Japan .................. 62-81692
[51] Int. Cl.$^4$ ........................... H04N 1/10
[52] U.S. Cl. .................. 250/578; 250/235; 355/57; 358/451; 358/494
[58] Field of Search ........... 250/234, 235, 236, 578; 358/285, 287, 293; 355/55, 56, 57; 350/486

[56] References Cited
U.S. PATENT DOCUMENTS

| | | | |
|---|---|---|---|
| 3,837,743 | 9/1974 | Amemiya | 358/287 |
| 4,116,561 | 9/1978 | Knechtel et al. | 355/57 |
| 4,256,969 | 3/1981 | Lianza | 358/293 |
| 4,424,534 | 1/1984 | Nagane | 358/293 |
| 4,571,376 | 6/1988 | Sugiura et al. | 358/293 |

FOREIGN PATENT DOCUMENTS 60-218618  11/1985  Japan .

Primary Examiner—Edward P. Westin
Attorney, Agent, or Firm—Price, Gess & Ubell

[57] ABSTRACT

An image scanning apparatus including a scanning optical system, an image sensor for converting an image beam received from the scanning optical system into an electric signal, and a projecting lens disposed on an optical path between the scanning optical system and the image sensor. The projecting lens is movable along the optical axis for varying projecting magnification. A swing mirror is additionally provided on the optical path between the scanning optical system and the projecting lens. When in an operative position, the swing mirror intercepts the optical path and establishes a shorter optical path for use in obtaining the image of a film or the like in super-magnification.

7 Claims, 3 Drawing Sheets

IMAGE SCANNING APPARATUS WITH EXPANDED MAGNIFICATION CAPABILITY

BACKGROUND OF THE INVENTION (1) Field of the Invention

The present invention relates to an image scanning apparatus and particularly an image scanning apparatus including an optical magnification varying mechanism capable of super-or oversize magnification.

(2) Description of the Prior Art

A conventional image scanning apparatus has a construction as illustrated in FIG. 6. In the illustrated apparatus, an original document (not shown) placed on a document table 101 consisting of a glass plate is illuminated by light emitted from a light source 102 and condensed by a reflecting mirror 103. The light reflected by the document travels via mirrors 104, 105 and 106 to a lens 107 and forms an image on an array of light receiving elements 108. The light source 102, reflecting mirror 103 and mirror 104 are movable as a unit to scan the document, and the mirrors 105 and 106 connected thereto by an unillustrated wire or the like are also movable together, whereby the optical path has a constant length during scanning operation. The apparatus for scanning the document and converting its image into electric data by the light receiving elements as above is generally called an image scanner.

In enlarging the document image with this type of image scanning apparatus which employs the photoelectric conversion, it is more advantageous in terms of reproduced image quality to provide an optical enlargement of the image rather than an electrical one. Thus the magnification is changed by varying the distances between the original document and the lens and between the lens and the light receiving elements. The document to lens distance is varied by actuating an unillustrated motor to move a movable support 110 carrying the lens 107 along a guide member 109 in directions following the optical path. The lens to right receiving element distance is varied by actuating a motor 113 to move, by means of a lead screw or the like, a slider 112 carrying the array of light receiving elements 108 along a guide 111 attached to the movable support 110.

In reproduction with the above construction, document to lens distance $a_1$ mm, lens to light receiving element distance $b_1$ mm, focal length of the lens f mm and magnification $\beta$ are in the following relationship:

$$a_1 = -f(1 - 1/\beta)$$

$$b_a = -f(1 - \beta)$$

Assuming that the light receiving elements 108 have a pitch of 7 micrometers and the reproduction density is 400 dpi (dots per inch), then the magnification $\beta$ provided by this optical system will be $-1/9.07$. Where the focal length f is 50 mm, $a_1$ will be 503.3 mm and $b_1$ 55.5 mm. By arranging the documents, lens and light receiving elements at these distances, the reproduction may have a 400 dpi resolving power.

On the other hand, providing for the reproduced image at a double size, the above magnification $\beta$ is doubled to be $-2/9.07$. Then document to lens distance $a_2$ and lens to light receiving element distance $b_2$ will be 277.8 mm and 61.0 mm, respectively.

It will be appreciated that, when the reproducing magnification is changed to the double size, the document to lens distance must be reduced by 222.5 mm and the lens to light receiving element distance increased by 5.5 mm.

If the reproducing magnification is further increased, the document to lens distance must be reduced even more and ultimately the lens 107 would have to be brought into contact with the mirror 106.

The focal length f of lens 107, on the other hand, needs to be increased to realize a reduced angle of view. The focal length f of about 50 mm as mentioned above is considered appropriate since an increased focal length would elongate the optical path and require the entire apparatus to be enlarged accordingly. Consequently, the lens 107 is movable within a range of about 200-300 mm only, which sets a magnification limit to double size or thereabouts. It is thus difficult for existing image scanning apparatus to realize reproduction of, for instance, film images magnified several times.

SUMMARY OF THE INVENTION

The object of the present invention is to provide an image scanning apparatus with significantly improved magnifying power.

The present invention relates to an apparatus, for scanning an image of a document, comprising means for supporting a document, a scanning optical system movable along the document supporting means for exposing and scanning the document placed on the document supporting means, an image sensor for converting an image received from the document into an electric signal, and a projecting lens disposed on an optical path between the scanning optical system and the image sensor for projecting the image onto the image sensor, the projecting lens being movable along the optical axis for varying projecting magnification.

The invention contemplates establishment of a shorter image projecting optical path than an image projecting optical path extending via the scanning optical system by moving into the optical path a movable mirror disposed between the scanning optical system and the projecting lens so as to be movable onto and away from the optical path. The movement of the movable mirror into a position to intercept the optical path results in formation of a bypass optical path which shortens the distance between the document and the lens and allows high magnification rates. Consequently, the image of a small document such as a film may be obtained in higher magnification in a single process. This simple addition of the movable mirror to the conventional image scanning apparatus enables the apparatus to have a function to obtain the image in super-magnification.

It is advantageous if, according to another embodiment of this invention, the image sensor, projecting lens and movable mirror are movable together along the optical axis. This arrangement permits a drive mechanism for the image sensor and projecting lens to be used for driving the movable lens as well.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
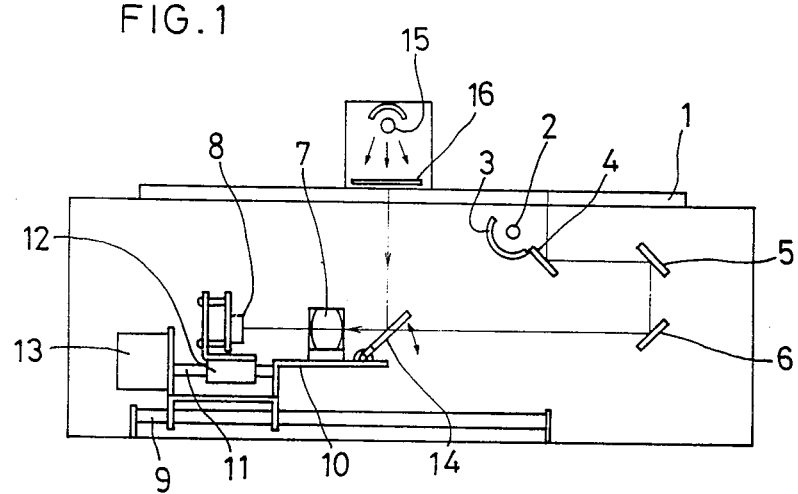
FIG. 1 is an overall view of an image scanning apparatus according to one embodiment of the present invention.

An embodiment of the present invention is shown in FIG. 1. As seen, the image scanning apparatus comprises a light source 2 for emitting light and a reflecting mirror 3 for condensing the light, to illuminate an original document placed on a document table 1 consisting of a glass plate. The apparatus further comprises mirrors 4, 5 and 6 for directing the light reflected by the document to a lens 7 for forming an image on an array of light receiving elements 8. The light source 2, reflecting mirror 3 and mirror 4 are movable as a unit to scan the document, and the mirrors 5 and 6 connected thereto by an unillustrated wire or the like are also movable together, whereby the optical path has a constant length during scanning operation.

The lens 7 is mounted on a movable support 10 which is driven by an unillustrated motor to move along a guide member 9 extending parallel to an optical axis. The array of light receiving elements 8 is mounted on a slider 12 which is driven by a motor 13 through a lead screw or the like to move along a guide member 11 attached to the movable support 10. The movable support 10 carries a swing mirror 14 vertically pivotably attached to a position forwardly, i.e. opposite an entrance end, of the lens 7. When the swing mirror 14 is in an upper position intersecting the optical path at 45 degrees, the image of the document placed on the document table 1 is transmitted into the lens 7 by the swing mirror 14 bypassing the optical path between the document and the lens 7. The swing mirror 14 is pivotable to a lower horizontal position retracted from the optical path. The swing mirror 14 is driven by a solenoid, a motor or the like, not shown. This scanning apparatus also includes an illuminating device 15 being provided on the document table 1 and just above the mirror 14 for illuminating a penetrable document 16 such as a film.

According to the above construction, a scanning operation of an ordinary document is carried out in the conventional way, namely by placing the document on the document table 1, causing the light source 2 to emit light, and allowing the light reflected by the document to travel via the mirrors 4, 5 and 6 to the light receiving elements 8. When the translucent document 16 such as a film is scanned and reproduced in super-magnification, the illuminating device 15 is used to eliminate the document 16 and the swing mirror 14 is pivoted upward to set up an optical bypass which is shorter than the optical path extending by way of the mirrors 4, 5 and 6. This allows the light passing through the translucent document 16 to travel via the swing mirror 14 and lens 7 to the light receiving elements 8. The shorter optical path thus provided between the document and the lens 7 enables a great degree of magnification. The scanning is effected by moving the movable support 10, and the distance between the lens 7 and the light receiving elements 8 is varied by moving the latter in accordance with a selected magnification.

Figure 2:
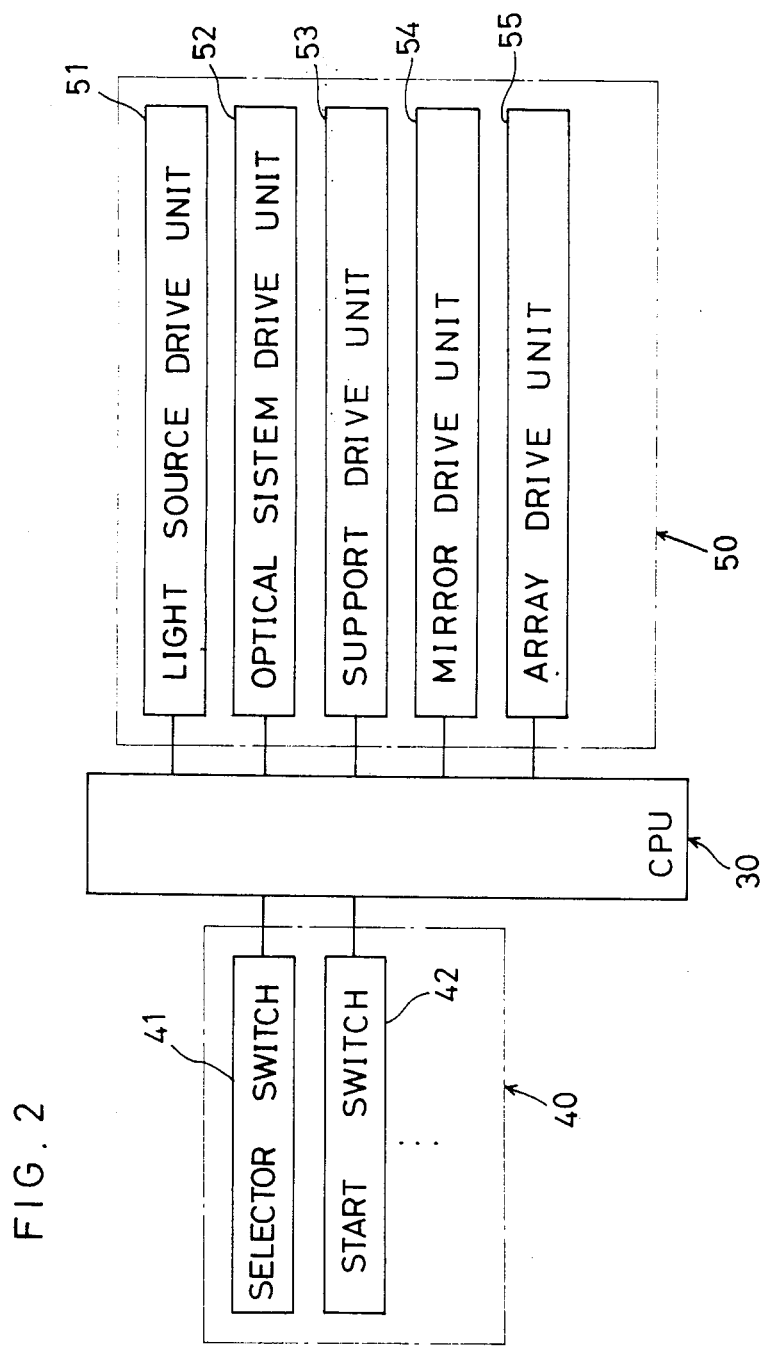
FIG. 2 is a block diagram of a control system.

A control system for operating this apparatus will be described briefly with reference to FIG. 2. The illustrated control system comprises a CPU 30 acting as the nucleus of the system, a group of switches 40 acting as input means for CPU 30, and an interface 50 for driving the described components of the scanning apparatus. The group of switches 40 includes a selector switch 41 for selecting between an ordinary reading mode for obtaining a real-size reproduction of an image and a super-magnification reading mode for obtaining a more enlarged reproduction of the image, and a start switch 42 for triggering a series of scanning actions. The interface 50 includes a light source drive unit 51 for controlling the light source 2 and illuminating device 15, an optical system drive unit 52 for moving the light source 2, reflecting mirror 3, and mirrors 4, 5 and 6 to scan the document, a movable support drive unit 53 for controlling the movement of the movable support 10 in the scanning and magnification varying operations, a mirror drive unit 54 for controlling the pivotal movement of the swing mirror 14, and an array drive unit 55 for controlling the movement of the array of light receiving elements 8 for adjusting the optical path length for the magnified reproduction.

Figure 3:
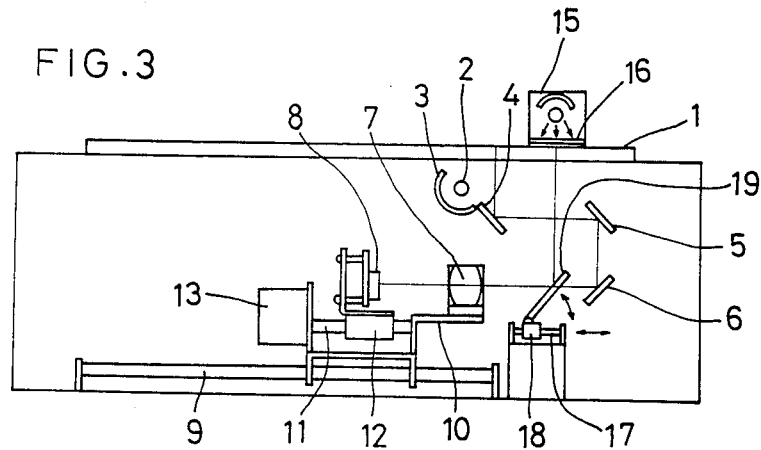
FIGS. 3 through 5 are overall views of different embodiments of the invention, respectively.

In the foregoing embodiment, the swing mirror 14 is mounted on the movable support 10 of the lens 7. This arrangement may be varied as shown in FIG. 3, for example. In the embodiment of FIG. 3, includes a movable member 18 separate from the movable support 10 and movable along a guide member 17 fixed to a main body portion, and a swing mirror 19 mounted on the movable member 18. With this embodiment, the penetrable document 16 is scanned by moving the document 16 or by moving the support 10 and member 18 without changing a distance therebetween.

Figure 4:
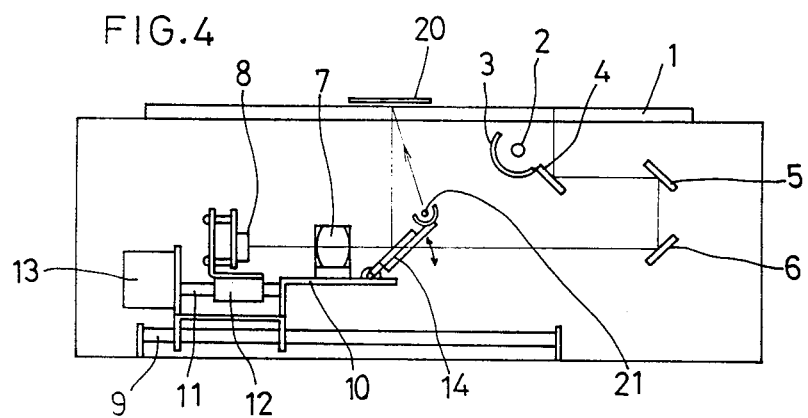
Figure 5:
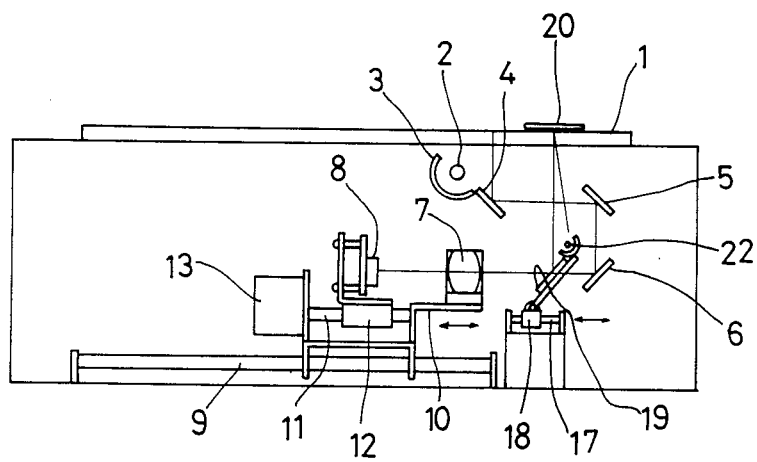
Figure 6:
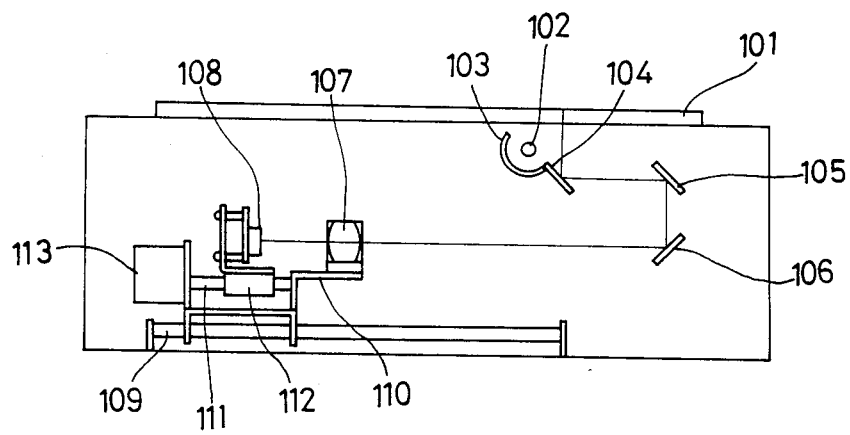
FIG. 6 is an overall view of an image scanning apparatus according to the prior art.

In the two embodiments described above, the subject matter of the invention is directed, by way of example, to the scanning of the penetrable document 16. The invention is of course applicable also to the case of obtaining enlarged images of the ordinary document, i.e. the document which reflects the light of the light source. As shown in FIG. 4, for example, an illuminating device 21 may be provided at an upper end of the swing mirror mounted on the movable support 10 shown in FIG. 1, for emitting light to an ordinary document 20 placed on the document table 1. Alternatively, as shown in FIG. 5, a similar illuminating device 22 may be provided at an upper end of the swing mirror 19 mounted on the movable member 18 shown in FIG. 3.

Further, in the two preceding embodiments, the illuminating device is movable when the document is scanned for super-magnification reading. In the case of the ordinary document 20 as illustrated in FIGS. 4 and 5, a suitable reflecting mirror may be provided for the document 20 to be illuminated by the light from the light source 2 or the document 20 may be illuminated by an illuminating device fixed to the main body portion. Then the light projected to the document must have a substantially uniform illuminance in a scanning direction.

What is claimed is:

1. An apparatus for scanning an image of a document comprising:
    means for supporting a document;
    a scanning optical system movable along said document supporting means for exposing and scanning the document placed on said document supporting means;

an image sensor for converting an image received from the document into an electric signal;

a projecting lens disposed on an optical path between said scanning optical system and said image sensor for projecting the image onto said image sensor, said projecting lens being movable along the optical axis for varying projecting magnification; and a movable mirror disposed between said scanning optical system and said projecting lens so as to be movable onto and away from the optical path, establishing a shorter image projecting optical path than an image projecting optical path extending via said scanning optical system.

2. An apparatus as claimed in claim 1, wherein said image sensor, said projecting lens and said movable mirror are movable together along the optical axis for scanning the image when the image is projected via said movable mirror.

3. An apparatus as claimed in claim 1, wherein said image sensor is movable relative to said projecting lens along said optical path for adjusting an optical path length.

4. An apparatus as claimed in claim 1, further comprising illuminating means disposed upwardly of said document supporting means for illuminating a penetrable document placed on said document supporting means, wherein said light emitted from said illuminating means travels through the penetrable document and reaches said projecting lens by way of said movable mirror.

5. An apparatus as claimed in claim 1, further comprising illuminating means secured to said movable mirror for illuminating the document placed on said document supporting means, wherein light emitted from said illuminating means is reflected by the document and reaches said projecting lens by way of said movable mirror.

6. In an apparatus having an image sensor for receiving a projected image of an original by a scanning optical system movable relative to the original, the optical system including at least one mirror between the original and a projection lens for focusing the image on the image sensor and defining a first variable optical path for providing a first magnification range of the image, the optical system further including a primary illumination system for illumination of the first variable optical path, the improvement comprising:

a second movable mirror positioned to move approximately transverse to the first optical path to optionally create a second optical path with a second magnification capability beyond the first magnification range;

means for moving the second movable mirror into and out of the first optical path, and a secondary illumination system for illumination of the second optical path.

7. The apparatus of claim 6 wherein the secondary illumination system is mounted for correlated movement with the second movable mirror.

* * * * *